Patented July 10, 1928.

1,676,579

UNITED STATES PATENT OFFICE.

GEORGE SPERTI, OF COVINGTON, KENTUCKY; ROBERT J. NORRIS, OF GREENVILLE, AND ROBERT B. WITHROW AND HERMAN SCHNEIDER, OF CINCINNATI, OHIO, ASSIGNORS TO DANIEL LAURENCE, TRUSTEE, OF CINCINNATI, OHIO.

LIGHT-TREATMENT PROCESS.

No Drawing. Application filed February 14, 1927. Serial No. 168,226.

Our invention relates to processes of destroying bacteriological impurities in enzymes or other sensitive organic bodies, without destroying the enzymes or bodies themselves. It has broader applications to differential treatment of various organic mixtures, solutions or compounds, whereby certain parts or molecular constituents of the organic material are destructively treated or activated without destruction or activation of other parts.

The basic development involves a discovery which we have made that may be graphically explained as follows: Let it be assumed that a suitable support is provided, and a substance spread in a band across the support, preferably in a light transmitting solution, say in pure water.

Then by means of a suitable difraction grating or otherwise impose a complete spectrum of light so as to coincide with the band of solution.

It will then be found that either within the visible or the ultra violet or infra red portion of the spectrum, the substance will exhibit a change. The discovery lies in the fact that this change will exhibit itself as having a very distinct beginning point, so that it appears that certain portions of the spectrum of light (the commercial adaptations of the principle naturally lying mainly in the ultra violet range), will have an effect on the substance, while the rest of the spectral band will not. It also lies in the fact that the intensity of the exposure given to the substance will not vary this rule.

It is our object in the present specification to point out the industrial applications of our discovery, and we will apply our invention to the elimination of bacteria from solutions containing the enzymatic substances, which may or may not have been produced by the activity of the said bacteria as a typical example indicating a preferred mode of practice of general application.

In the first place, the mechanical structure used to produce wave bands of desired nature, may be provided as follows:—A quartz lamp, such as may be purchased on the market, may be used for a light source. A filter or screen can be made up by taking two pieces of quartz sheet and a flat ring, and cementing the pieces of quartz on both faces of the ring, so as to form a flat quartz sheet enclosed container. A solution with pure water of a substance known to have a desired effect on the spectral band, is placed into the container or filter body before cementing the top quartz glass on the ring. It is well also to protect the solution from being affected by the ring, by painting the ring with some inert substance.

The light is projected through the screen onto the solution to be acted upon.

As one example, we have referred to the killing of bacteria in enzymatic solutions. We have found by a series of tests, that certain bacteria will be killed by projecting ultra violet light against them for a short period, where the wave length of the light is below 2750 units. The unit used in our work is the Angstroom unit, indicated by the symbol $A°$ which represents a ray of light having a wave length of one hundred millionth of a centimeter. The bacteria we have worked with are killed by light rays beginning at around or below $2750°$. Enzymes, such as we have worked with, are rendered inactive when treated with light rays having wave lengths of $2420$ $A°$ and shorter. Radiations of wave lengths greater than $2750$ $A°$ will not kill bacteria.

It thus rests with us to produce a filter which will permit $2750$ $A°$ to pass, but will exclude all light rays of $2400$ $A°$ and shorter, to permit of killing the bacteria without inactivating the enzyme.

Such a filter can be produced (we give but one way, as there are many open), by filling the filter screen last above described with a five per cent solution of lead acetate in pure water.

We have by the use of such a filter killed the bacteria in a substance containing a diastatic enzyme such as may be used in the making of bread by bakers. We can also kill the gas producing bacteria which bring about the conversion of sugars into alcohols, so that the gaseous type of fermentation need not be followed in the production of alcohols from sugar containing solutions, if proper enzyme is present.

It is also practical, and we have killed protozoa in solutions containing other substances which are desirable, and which are not changed by the treatment.

The substance to be treated, for example a solution of yeast, is brought to a thin film in any desired way, and subjected to the light from the quartz lamp, said light passing through the filter screen which is interposed. The period of treatment can be prolonged without deleterious effect. The lead acetate screen may be used. In treating a flowing film repeated exposures instead of prolonged exposures will be satisfactory.

We have stated as of general application to enzymatic solutions containing bacteria, the rough figures of 2750 A° as the upper limit for passage of rays, and do not wish to be construed as representing that this figure is completely accurate. We have calculated it as closely as our filters and other data will permit, but will base our invention herein more positively on this, i. e., that a five per cent solution of lead acetate in a proper filter which permits light rays of all wave lengths to pass without apparent obstruction, will not permit rays of light that inactivate any enzymes with which we have experimented, from passing through. The action of various types of filters upon the spectral band have been investigated, and considerable data on this will be found available.

It is evident that a general application of ultra violet rays will kill bacteria in a light transmitting solution, but since this will also inactivate the enzymes, it is not practical to so treat enzyme solutions in which the enzyme is to be preserved.

As uses for our invention, we may suggest the sterilization of protein compounds used as serums, sterilization of any enzymatic solution, inactivation of elements of delicate organic compounds and even the fractional breaking down of inorganic compounds. As a general rule it may be stated that the light rays short of X-rays react on molecular arrangement of substances, while X-rays react upon the atomic structure. Our work in light rays thus has its greatest use, so far as we have been able to determine, in connection with the delicate substances of organic nature of the types heretofore mentioned.

We believe also, that portions of substances can be activated instead of being inactivated, without activating undesirable portions thereof. Activation by light rays is known, but the fact that here again the action is critical for each substance, has not been known. Thus, in treating cod liver oil to activate the vitamin, it should be possible to select the critical band which does the activating, and thus avoid any danger due to over-exposure, which has been found in the past to inactivate the vitamin.

The general aspects of our invention reside in the fact that by following the teachings hitherto set forth, it will be readily possible for the investigator to use the various filters which are available, or make up new ones for himself, and he will be able by empirical results to determine what the critical wave band may be for any substance with which he is endeavoring to work, and for the elements that make it up. As stated, there are fairly well worked out filters, and by trying one after the other on any substance its critical range can be determined.

Having thus described our invention, what we claim as new and desire to secure by Letters Patent, is:—

1. That process for differentially affecting substances by means of rays of light, which consists in treating said substances with light from which has been filtered those rays which affect the portions of said substances which are not to be treated, thus confining the action to those portions which it is desired to treat.

2. That process for killing bacteria in chemical compounds which will be affected deleteriously by heat and unscreened ultra violet light, which consists in treating the compounds with light from which has been filtered that portion which affects the chemical compounds, leaving that portion which kills the bacteria.

3. That process for killing bacteria in an enzymatic solution, which consists in treating the solution with rays of light from which have been filtered those rays which affect the enzymatic portion, but not filtering therefrom those rays which kill bacteria.

4. That process for killing bacteria in solutions, which consists in treating the solution with rays of light from which have been filtered those rays which act upon desired elements in the solutions, but not filtering therefrom the bacteria killing rays.

5. That process for killing bacteria in solutions, which consists in treating the solutions with light from which has been filtered those rays which are eliminated by a lead acetate screen.

6. That process for killing bacteria in solutions, which consists in treating the solutions with light from which has been filtered those rays having shorter than 2750 A° wave length.

7. That process for killing bacteria in solutions containing enzymes, which consists in treating the solutions with light from which wave lengths shorter than 2750 A° have been eliminated.

8. That process for differentially affecting organic substances having a plurality of ingredients by means of rays of light, which consists in treating said substances with a predetermined spectral band of light, to the exlusion of others, said predetermined band having an effect on a part only of the ingredients of said organic substances.

9. That process for treating substances with light rays, which consists in selecting the critical spectral band which reacts upon said substance, and confining the light treatment to said critical band.

HERMAN SCHNEIDER.
GEORGE SPERTI.
ROBERT B. WITHROW.
ROBERT J. NORRIS.